US010066581B2

(12) United States Patent
Mecuson et al.

(10) Patent No.: US 10,066,581 B2
(45) Date of Patent: Sep. 4, 2018

(54) STRUCTURE FOR FASTENING AFTER-BODY PARTS OF AN AEROENGINE

(71) Applicant: HERAKLES, Le Haillan (FR)

(72) Inventors: Gautier Mecuson, Bordeaux (FR); Eric Conete, Merignac (FR); Benoit Carrere, Le Taillan Medoc (FR); Eric Philippe, Merignac (FR)

(73) Assignee: SAFRAN NACELLES, Gonfreville Lorcher (FR)

( * ) Notice: Subject to any disclaimer, the term of this patent is extended or adjusted under 35 U.S.C. 154(b) by 569 days.

(21) Appl. No.: 14/388,895

(22) PCT Filed: Mar. 28, 2013

(86) PCT No.: PCT/FR2013/050669
§ 371 (c)(1),
(2) Date: Sep. 29, 2014

(87) PCT Pub. No.: WO2013/144512
PCT Pub. Date: Oct. 3, 2013

(65) Prior Publication Data
US 2015/0083822 A1    Mar. 26, 2015

(30) Foreign Application Priority Data
Mar. 29, 2012   (FR) ..................................... 12 52848

(51) Int. Cl.
*F02K 1/78*   (2006.01)
*F02K 1/80*   (2006.01)
(Continued)

(52) U.S. Cl.
CPC .............. *F02K 1/04* (2013.01); *F01D 25/162* (2013.01); *F01D 25/243* (2013.01); *F02C 7/20* (2013.01);
(Continued)

(58) Field of Classification Search
CPC .......... F01D 25/16; F01D 25/243; F02C 7/20; F02K 1/04; F02K 1/08; F02K 1/78; F02K 1/80; F02K 1/82
See application file for complete search history.

(56) References Cited

U.S. PATENT DOCUMENTS 2,410,450 A * 11/1946 Kroon ................... F01D 25/162
                                                                    384/317
2,633,705 A *  4/1953 Hawkins ................... F02C 3/06
                                                                    60/804
(Continued)

FOREIGN PATENT DOCUMENTS

FR        2401888 A1   3/1979
WO   2010061140 A1   6/2010

OTHER PUBLICATIONS

International Search Report for corresponding International PCT Application No. PCT/FR2013/050669, dated Aug. 2, 2013.

*Primary Examiner* — Lorne Meade
*Assistant Examiner* — Eric Linderman
(74) *Attorney, Agent, or Firm* — Workman Nydegger

(57) ABSTRACT

The invention relates to an aeroengine after-body assembly comprising an exhaust casing made of metal having a plurality of arms extending radially between an inner shroud and an outer shroud. The assembly comprises at least one axisymmetric part made of composite material extending between an upstream end fastened to said exhaust casing and a downstream end that is free. In accordance with the invention, the axisymmetric part has an annular portion at its upstream end, which annular portion includes a plurality of slots defining between them a plurality of resilient fastener tabs. Each slot co-operates with an arm of the exhaust casing, which further includes fastener parts attached to the resilient fastening tabs.

8 Claims, 4 Drawing Sheets

(51) Int. Cl.
*F02K 1/82* (2006.01)
*F02K 1/04* (2006.01)
*F01D 25/16* (2006.01)
*F01D 25/24* (2006.01)
*F02C 7/20* (2006.01)

(52) U.S. Cl.
CPC ............. *F02K 1/80* (2013.01); *F01D 25/16* (2013.01); *F02K 1/78* (2013.01); *F02K 1/82* (2013.01); *Y02T 50/672* (2013.01)

(56) References Cited

U.S. PATENT DOCUMENTS

| | | | | |
|---|---|---|---|---|
| 2,938,336 A * | 5/1960 | Peterson | F01D 9/065 | 60/39.5 |
| 3,398,535 A * | 8/1968 | Hemsworth | B64D 27/18 | 415/142 |
| 3,734,639 A * | 5/1973 | Short | F01D 5/185 | 415/114 |
| 3,830,058 A * | 8/1974 | Ainsworth | F02C 7/20 | 244/54 |
| 4,132,069 A * | 1/1979 | Adamson | B64D 27/18 | 137/15.1 |
| 5,076,049 A * | 12/1991 | Von Benken | F01D 25/24 | 415/138 |
| 5,114,446 A * | 5/1992 | Giersdorf | F01D 25/18 | 55/345 |
| 5,161,947 A * | 11/1992 | Eckfeldt | F02C 7/20 | 415/142 |
| 5,190,245 A * | 3/1993 | Debeneix | B64D 27/26 | 244/54 |
| 5,246,736 A * | 9/1993 | Goujard | C04B 35/565 | 427/249.15 |
| 5,249,877 A * | 10/1993 | Corsmeier | F01D 25/246 | 403/24 |
| 5,259,183 A * | 11/1993 | Debeneix | B64D 27/18 | 244/54 |
| 5,292,227 A * | 3/1994 | Czachor | F01D 25/162 | 415/142 |
| 5,357,744 A * | 10/1994 | Czachor | F01D 9/065 | 415/134 |
| 5,603,471 A * | 2/1997 | Armstrong | B64D 29/00 | 239/265.31 |
| 5,965,266 A | 10/1999 | Goujard et al. | | |
| 6,068,930 A * | 5/2000 | Lamouroux | C04B 35/563 | 264/29.1 |
| 6,291,058 B1 * | 9/2001 | Goujard | C04B 35/565 | 428/293.4 |
| 6,358,001 B1 * | 3/2002 | Bosel | F01D 25/24 | 411/178 |
| 6,439,841 B1 * | 8/2002 | Bosel | F01D 9/065 | 415/142 |
| 6,668,559 B2 * | 12/2003 | Calvez | F23R 3/007 | 60/753 |
| 6,942,452 B2 * | 9/2005 | Bruno | F01D 9/065 | 16/2.2 |
| 7,124,572 B2 * | 10/2006 | Aycock | F01D 9/065 | 415/142 |
| 7,234,306 B2 * | 6/2007 | Aumont | F23R 3/60 | 60/753 |
| 7,237,388 B2 * | 7/2007 | Aumont | F01D 9/023 | 60/753 |
| 8,272,203 B2 * | 9/2012 | Derenes | F01D 25/24 | 415/213.1 |
| 8,915,707 B2 * | 12/2014 | Bruhwiler | F01D 9/044 | 415/215.1 |
| 9,163,525 B2 * | 10/2015 | Alexander | F01D 25/00 | |
| 9,212,567 B2 * | 12/2015 | Rauch | F01D 25/30 | |
| 9,309,159 B2 * | 4/2016 | Charleux | C04B 35/52 | |
| 2004/0103534 A1 * | 6/2004 | Lundgren | B23P 15/04 | 29/889.22 |
| 2005/0022501 A1 * | 2/2005 | Eleftheriou | F01D 5/22 | 60/226.1 |
| 2006/0042223 A1 * | 3/2006 | Walker | F01D 9/065 | 60/39.08 |
| 2007/0241257 A1 * | 10/2007 | Eleftheriou | F01D 25/162 | 248/554 |
| 2008/0104941 A1 * | 5/2008 | Blanchard | F02K 1/04 | 60/272 |
| 2008/0115484 A1 * | 5/2008 | Conete | F02K 1/48 | 60/262 |
| 2008/0307795 A1 * | 12/2008 | Bader | F01D 25/30 | 60/797 |
| 2010/0102144 A1 * | 4/2010 | Conete | F01D 25/243 | 239/265.11 |
| 2010/0205930 A1 * | 8/2010 | Conete | F02K 1/04 | 60/226.1 |
| 2010/0207379 A1 * | 8/2010 | Olver | F16L 23/167 | 285/13 |
| 2011/0000223 A1 * | 1/2011 | Russberg | F01D 9/041 | 60/796 |
| 2011/0073745 A1 * | 3/2011 | Duchatelle | F01D 9/04 | 248/637 |
| 2011/0173990 A1 * | 7/2011 | Thies | F01D 25/28 | 60/796 |
| 2011/0174919 A1 * | 7/2011 | Caruel | B64D 27/26 | 244/54 |
| 2011/0203255 A1 * | 8/2011 | Conete | F02K 1/04 | 60/226.1 |
| 2011/0311368 A1 | 12/2011 | Coupe et al. | | |
| 2012/0093642 A1 * | 4/2012 | Nilsson | F01D 9/04 | 415/213.1 |
| 2012/0204569 A1 * | 8/2012 | Schubert | F02C 7/20 | 60/772 |
| 2012/0301691 A1 * | 11/2012 | Charleux | C04B 35/52 | 428/213 |
| 2013/0111906 A1 * | 5/2013 | Bouchard | F02K 1/827 | 60/694 |
| 2013/0125560 A1 * | 5/2013 | Bellabal | B64D 27/20 | 60/797 |
| 2014/0003922 A1 * | 1/2014 | Daniels | F01D 25/24 | 415/182.1 |
| 2014/0186167 A1 * | 7/2014 | Liles | F01D 25/162 | 415/182.1 |
| 2014/0311161 A1 * | 10/2014 | Bellabal | F01D 5/145 | 60/796 |
| 2014/0332604 A1 * | 11/2014 | Andlauer | F23R 3/60 | 239/265.11 |
| 2014/0373556 A1 * | 12/2014 | Aronsson | F01D 25/162 | 60/796 |
| 2015/0040393 A1 * | 2/2015 | Shteyman | B23P 15/00 | 29/888.02 |
| 2015/0098811 A1 * | 4/2015 | Roth | F01D 25/28 | 415/207 |
| 2015/0143810 A1 * | 5/2015 | Salunkhe | F01D 25/30 | 60/772 |
| 2015/0143813 A1 * | 5/2015 | Salunkhe | F01D 25/30 | 60/796 |
| 2015/0143814 A1 * | 5/2015 | Orosa | F01D 25/30 | 60/796 |
| 2015/0143816 A1 * | 5/2015 | Salunkhe | F01D 25/30 | 60/796 |
| 2015/0176494 A1 * | 6/2015 | Johnsson | F01D 9/065 | 60/796 |
| 2015/0226083 A1 * | 8/2015 | Renggli | F02C 7/20 | 60/796 |
| 2015/0345330 A1 * | 12/2015 | Budnick | F01D 25/162 | 415/177 |
| 2015/0354410 A1 * | 12/2015 | Budnick | F01D 25/28 | 415/177 |
| 2016/0017807 A1 * | 1/2016 | Chuong | F01D 25/30 | 415/213.1 |
| 2016/0186614 A1 * | 6/2016 | Paulino | F02C 7/20 | 415/211.2 |
| 2016/0186691 A1 * | 6/2016 | Charleux | C04B 35/52 | 428/220 |

* cited by examiner

STRUCTURE FOR FASTENING AFTER-BODY PARTS OF AN AEROENGINE

BACKGROUND OF THE INVENTION

The present invention relates to fastening parts made of composite material that are used in the after-bodies of aeroengines such as turbojets.

In order to reduce the weight of after-bodies, it is known to make one or more parts of an after-body, such as the exhaust cone and/or the primary nozzle, out of composite material instead of metal. Such parts present a coefficient of thermal expansion that is low compared with that of the metal exhaust casing of the engine on which they are to be mounted. In order to compensate for the differential expansion between such elements, the composite material parts are mounted on the metal casing by means of resiliently flexible fastener tabs that are generally made of refractory metal.

FIG. 5 shows a turbojet after-body as described in Document US 2011/203255. The after-body comprises an ejection or primary nozzle 10 and a central body or exhaust cone 20 (also known as a "plug"). The primary nozzle 10 and the exhaust cone 20 are made of CMC composite material which, in well-known manner, are made of fiber reinforcement made of (carbon or ceramic) refractory fibers and densified by a ceramic matrix, in particular a matrix of refractory carbide, nitride, or oxide.

The primary nozzle 10 is fastened on a first metal fastener ring 40 forming part of or designed to be fastened to the engine exhaust casing (not shown) by means of resiliently flexible fastener tabs 50. The exhaust cone 20 is fastened to a second metal fastener ring 60 likewise forming part of the exhaust casing by means of elastically deformable fastener tabs 70. The fastener tabs are made of a refractory material, such as, in particular, Inconel®, Hastelloy®, or Waspalloy®. Depending on the size and the weight of the CMC parts, the fastener tabs are dimensioned to provide mechanical strength to withstand both normal and limiting loads that correspond to maintaining radial and axial clearance between the CMC part and the metal part so as to make it possible to compensate for differential expansion and to damp vibration.

Nevertheless, fastening composite material parts on metal parts in that way presents certain drawbacks. Firstly, the metal fastener tabs represent a significant fraction of the total weight of the part, specifically about 30%. The use of fastener tabs of that type also makes it more complex to manage sealing with the casing. Finally, the cost of fabricating such fastener tabs is relatively high.

OBJECT AND SUMMARY OF THE INVENTION

An object of the present invention is to propose a novel design for integrating axisymmetric after-body parts made of composite material, such as an exhaust cone or a primary nozzle, in an exhaust casing, which design makes it possible to avoid using resilient fastener tabs made of metal.

To this end, the invention provides an aeroengine after-body assembly comprising an exhaust casing made of metal having a plurality of arms extending radially between an inner shroud and an outer shroud, said assembly further comprising at least one axisymmetric part made of composite material extending between an upstream end fastened to the exhaust casing and a downstream end that is free.

The assembly being characterized in that said axisymmetric part has an annular portion at its upstream end, which annular portion includes a plurality of slots defining between them a plurality of resilient fastener tabs, each slot co-operating with an arm of the exhaust casing, the exhaust casing further including fastener parts to which the resilient fastening tabs are attached.

By means of the design of the invention for the after-body assembly, there is no longer any need to use resilient fastener tabs made of metal material for the purpose of accommodating differential thermal expansion between each axisymmetric part made of composite material and the metal exhaust casing. This is because each axisymmetric part has slots that define flexible fastener tabs that are incorporated directly in the part and that serve to compensate differential thermal expansion relative to the exhaust casing. Thus, each axisymmetric part may be attached directly to the exhaust casing, thereby making it possible not only to save weight, but also to simplify assembling the after-body assembly and to reduce its cost.

In a first aspect of the invention, the after-body assembly includes an exhaust cone made of composite material fastened on the arms of the exhaust casing at intermediate positions between the inner shroud and the outer shroud of said casing, each of said arms including a fastener part at the level of said intermediate position, with a resilient fastener tab of the annular portion situated at the upstream end of the exhaust cone being attached thereto.

In a second aspect of the invention, the after-body includes an exhaust nozzle made of composite material fastened on the arms of the exhaust casing in positions close to the outer shroud of said casing, said outer shroud having fastener parts attached to the resilient fastener tabs of the annular portion situated at the upstream end of the exhaust nozzle.

In a third aspect of the invention, each slot includes a first portion extending from the upstream end of each axisymmetric part and presenting dimensions that correspond to the portion of the arm with which said slot co-operates. Each slot may also include a second portion extending downstream from the first portion in order to increase the flexibility of the resilient fastener tabs.

In a fourth aspect of the invention, each axisymmetric part is made of composite material comprising fiber reinforcement made of refractory fibers densified by a matrix that is at least partially ceramic. Under such circumstances, the matrix is a ceramic matrix selected from at least: an oxide; a nitride; a carbide; and a silicide. In particular, each axisymmetric part may be made of a composite material comprising fiber reinforcement made of silicon carbide fibers densified by a silicon carbide matrix including one or more self-healing phases.

The invention also provides an aeroengine including an after-body assembly of the invention and an aircraft including at least one such aeroengine.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF AN EMBODIMENT

Figure 1:
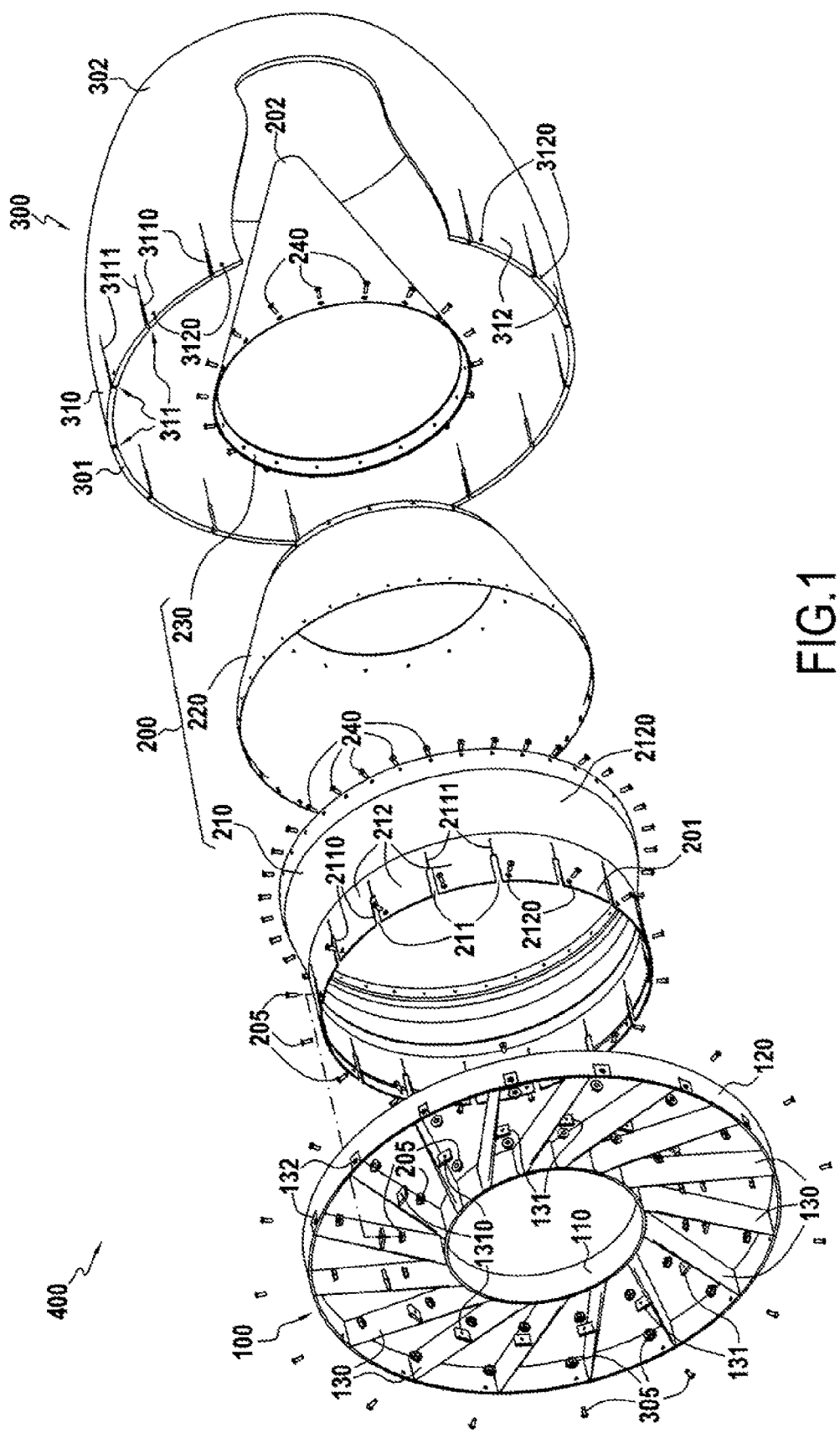
FIG. 1 is a diagrammatic exploded perspective view of a turbojet after-body in accordance with an embodiment of the invention.
Figure 2:
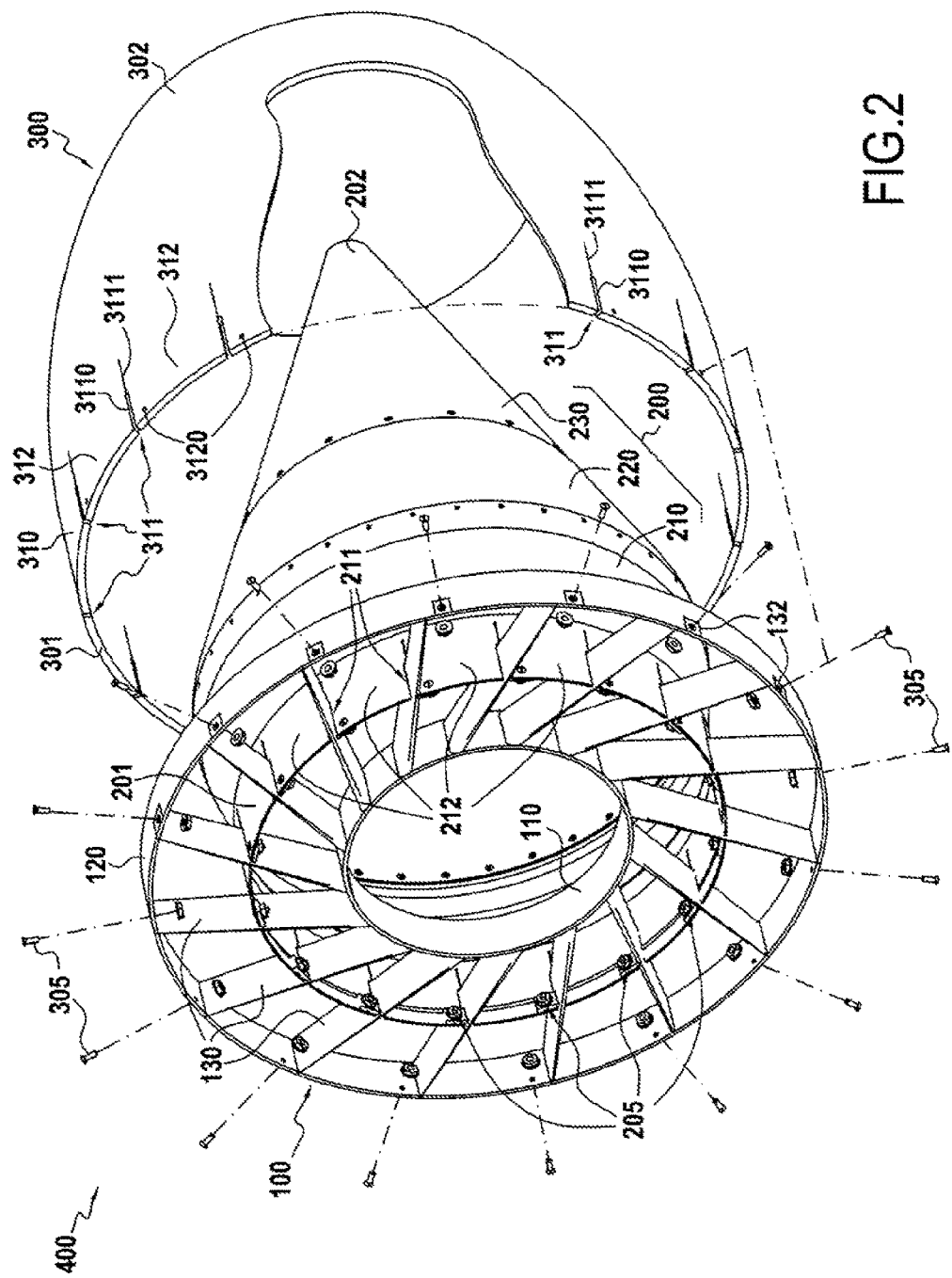
FIG. 2 is a diagrammatic perspective view of the FIG. 1 after-body when partially assembled.
Figure 3:
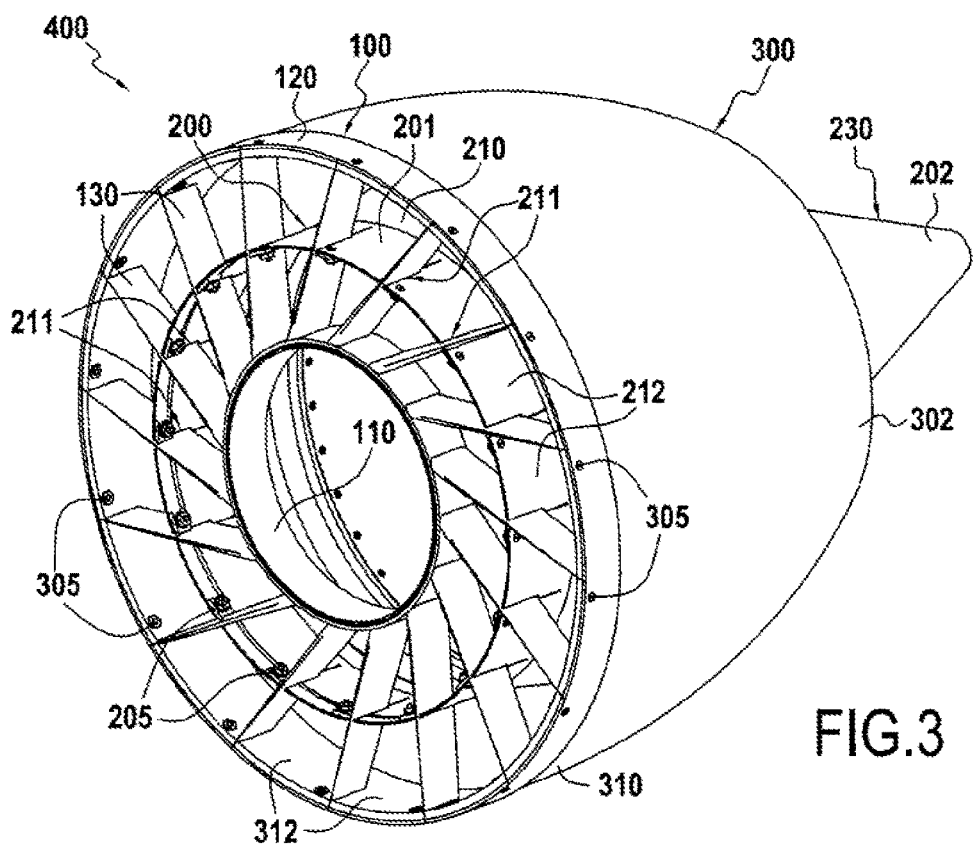
FIG. 3 is a diagrammatic perspective view of the FIG. 1 after-body when fully assembled.

FIGS. 1 to 3 show a turbojet after-body assembly 400 constituting the exhaust system of the turbojet. The after-body comprises an exhaust casing 100 and two axisymmetric parts corresponding to a central body or exhaust cone 200 (also referred to as a "plug") and an ejection or primary nozzle 300.

Figure 4:
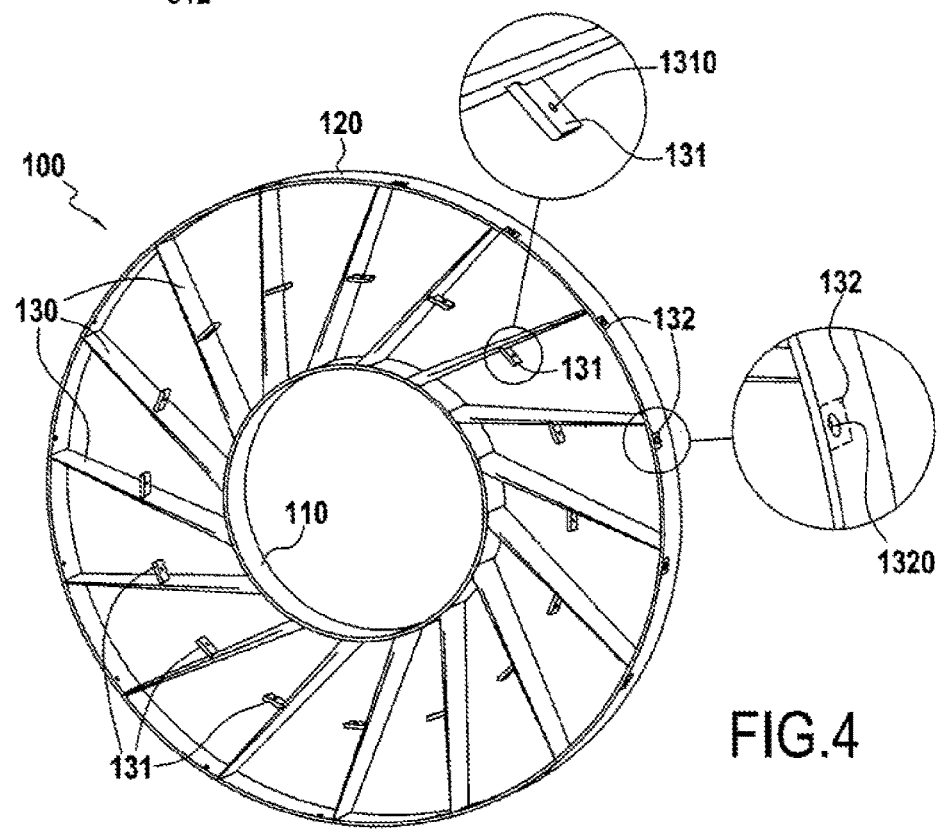
FIG. 4 is a diagrammatic perspective view of the casing of the FIG. 1 after-body.
Figure 5:
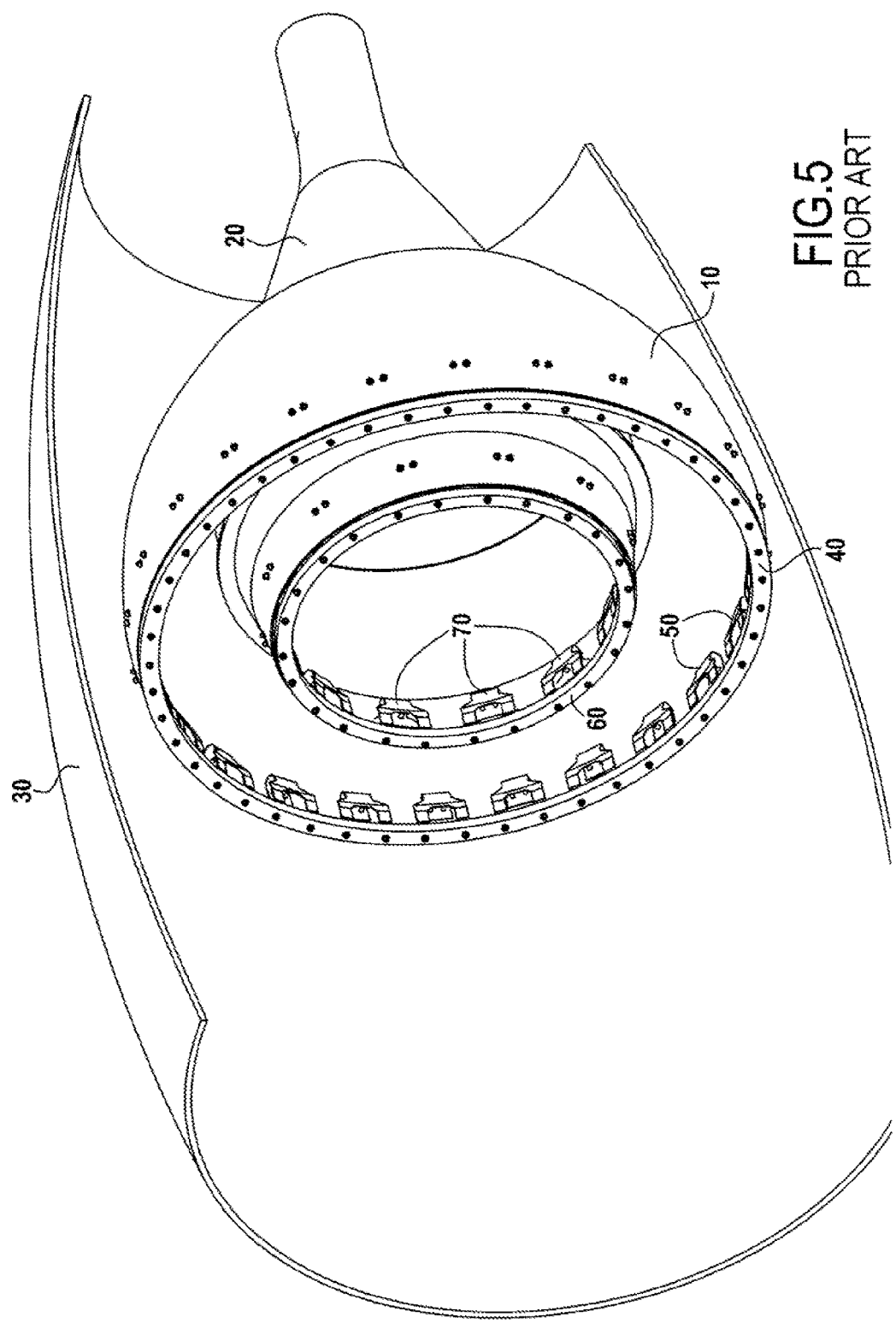
FIG. 5 is a diagrammatic perspective view of a prior art turbojet after-body.

The exhaust casing 100 is made of metal, e.g. of Inconel® 718, and it comprises an inner shroud 110 and an outer shroud 120 with arms 130 extending between them. As shown in FIG. 4, each arm 130 has a fastener part 131 situated at a position intermediate between the inner shroud 110 and the outer shroud 120 for the purpose of enabling the exhaust cone 200 to be fastened on the exhaust casing 100. In the example described in detail herein, the outer shroud 120 also has a series of fastener parts 132 situated close to the outer ends of the arms 130.

The exhaust cone 200 extends from upstream to downstream between an upstream end 201 and a downstream end 202 that is free. At its upstream end 201, the cone has an annular part 210 having slots 211 formed therein that open out into the upstream end 201. The slots 211 are distributed around the annular part 210 in positions that coincide with the positions of the arms 130 of the exhaust casing level with their fastener parts 131. The slots 211 define resilient fastener tabs 212 in the annular part 210.

Each slot 211 has a first portion 2110 presenting a length and a width that are suitable for receiving the corresponding portion of an arm 130 (FIG. 1). In the presently-described example, the slots 211 also include respective second portions 2111 extending downstream from their first portions 2110. Each second portion 2111 serves to increase the flexibility of the corresponding resilient fastener tab 212. Nevertheless, depending on requirements for flexibility, it is possible for the slots in the fastener tabs to include only the first portion that is to receive a corresponding arm of the exhaust casing.

The exhaust cone 200 is fastened on the exhaust casing 100 by fastener members 205 of the nut-and-bolt type that are arranged and clamped in holes 2120 and 1310 formed respectively in the resilient fastener tabs 212 and in the first fastener parts 131 (FIGS. 1 and 4). Other types of fastening such as brazing or adhesive could be used for fastening the exhaust cone to the exhaust casing.

The primary nozzle 300 extends from upstream to downstream between an upstream end 301 and a downstream end 302 that is free. The nozzle is provided at its upstream end 301 with an annular portion 310 having slots 311 formed therein that open out into the upstream end 201. The slots 311 are distributed around the annular portion 310 in positions that coincide with the positions of the arms 130 of the exhaust casing at the level of their fastener parts 132, i.e. in the proximity of the outer shroud 120 of the exhaust casing 100. The slots 311 define resilient fastener tabs 312 in the annular portion 310.

Each slot 311 has a first portion 3110 of length and width that are suitable for receiving the corresponding portion of an arm 130. In the presently-described example, the slots 311 further comprise respective second portions 3111 extending downstream from their first portions 3110 (FIGS.

1 and 2). Each second portion 3111 serves to increase the flexibility of the corresponding resilient fastener tab 312. Nevertheless, it is possible for the slots in the fastener tabs to comprise only the first portion that is to receive the arms of the exhaust casing, providing the flexibility conferred by the first portion suffices.

The primary nozzle is fastened on the exhaust casing 100 by nut-and-bolt type fastener members 305 arranged and clamped in holes 3120 and 1320 formed respectively in the resilient fastener tabs 312 and in the fastener parts 132 present in the outer shroud 120 of the casing 100 (FIGS. 1 and 4). Other types of fastening such as brazing or adhesive could be used for fastening the exhaust cone to the exhaust casing.

In accordance with the invention, the exhaust cone 200 and the primary nozzle 300 are made of thermostructural composite material, i.e. of a material that is suitable for forming structural parts having good mechanical characteristics and that is suitable for conserving them at high temperature.

In the presently-described example, the exhaust cone 200 is made up of three portions, each made of thermostructural composite material, namely the annular part 210, a frustoconical conical inner shroud 220, and an end cone 230, which portions are connected together by means of rivets 240. Nevertheless, the exhaust cone of the invention may be made with some other number of parts. The cone may in particular be made as a single piece in the general form of the above-described exhaust cone 200.

The presently-described primary nozzle 300 is made as a single piece, but it could likewise be made as a plurality of elements that are assembled together.

The parts constituting the exhaust cone 200 and the primary nozzle 300 are made in particular out of a carbon/carbon (C/C) composite material, which in known manner is a material made of carbon fiber reinforcement densified by a matrix made of carbon, or of CMC composite material, which in known manner is a material formed by carbon or ceramic fiber reinforcement densified by a matrix that is ceramic, at least in part. Thermostructural composite materials, such as C/C or CMC materials, are characterized by their good mechanical properties that make them suitable for constituting structural parts, and by their ability to retain these mechanical properties at high temperatures that may be greater than 1300° C. for a C/C or a CMC material. The parts constituting the exhaust cone 200 and the primary nozzle 300 are preferably made of CMC material, such as the Cerasep® A40C material that is made of silicon carbide (SiC) fiber reinforcement and a self-healing ceramic matrix, e.g. made of SiC.

The fabrication of composite material parts, in particular parts made of C/C or CMC, is well-known. It generally comprises making a fiber preform and densifying the preform with the matrix. The fiber preform is of a shape similar to that of the part that is to be fabricated, and it is made of refractory fibers, i.e. ceramic fibers, e.g. made of silicon carbide (SiC), carbon fibers, or indeed fibers made of a refractory oxide, such as alumina ($Al_2O_3$), for example.

The fiber preform constitutes the reinforcement of the part and plays an essential role in terms of mechanical properties. The preform is obtained from fiber textures made of refractory fibers. The fiber textures used may be of a variety of natures and shapes, such as in particular:

two-dimensional (2D) woven fabrics;

three-dimensional (3D) woven fabrics obtained by 3D or multi-layer weaving, as described in particular in document WO 2010/061140, the content of which is incorporated herein by reference;

braids;

knits;

felts; and/or unidirectional (UD) sheets of yarns or tows or multidirectional (nD) sheets obtained by superposing a plurality of UD sheets in different directions and bonding the UD sheets together, e.g. by stitching, by a chemical bonding agent, or by needling.

It is also possible to use a fiber structure made up of a plurality of superposed layers of woven fabrics, braids, knits, felts, sheets, tows, etc., which layers are bonded together by stitching, by implanting yarns or rigid elements, or by needling, for example.

Shaping is performed by winding filaments, winding a UD sheet on a mandrel, weaving, stacking, needling two-dimensional/three-dimensional plies or sheets of tows, etc.

Prior to densification, the fiber preform may be consolidated in order to give it sufficient mechanical strength to enable it to retain its shape while it is being handled.

With a C/C material, the fiber preform may be densified using a liquid technique, with the preform being impregnated with a precursor resin for the carbon matrix such as a phenolic type resin.

After being impregnated, the fiber preform that is to constitute the fiber reinforcement of the part that is to be made, and that has a shape corresponding substantially to the shape of that part, is put into its final shape with the help of support tooling. The resin(s) is/are then transformed by heat treatment (polymerization/carbonization). The operations of impregnation and of polymerization/carbonization may be repeated several times, if necessary, in order to obtain determined mechanical characteristics.

The fiber preform may also be densified, in known manner, by using a gaseous technique, involving chemical vapor infiltration (CVI) of the carbon matrix.

Densification combining a liquid technique and a gaseous technique is sometimes used in order to facilitate working, limit costs, and shorten fabrication cycles, while obtaining characteristics that are satisfactory for the intended use.

The CMC materials that can be used for making the axisymmetric after-body parts of the invention are formed by fiber reinforcement made of carbon or ceramic fibers that have been densified with a matrix that is made, at least in part, of ceramic and in particular of carbide, nitride, refractory oxide, etc., such as for example:

a carbon/carbon-silicon carbide (C/C—SiC) composite material, which is a material constituted by carbon fiber reinforcement that has been densified with a matrix comprising a carbon phase and a silicon carbide phase;

a carbon/silicon carbide (C/SiC) composite material, which is a material constituted by carbon fiber reinforcement that has been densified with a silicon carbide matrix; and/or a silicon carbide/silicon carbide (SiC/SiC) composite material, which is a material constituted by silicon carbide fiber reinforcement that has been densified with a silicon carbide matrix.

With the C—C/SiC material, the first carbon phase of the matrix is the first phase to be deposited so as to be present as close as possible to the fibers and so as subsequently to be covered by the second phase made of SiC, thus making it possible to form an SIC oxidation protection layer on the first phase that is made of carbon.

When densifying using a liquid technique, the matrix (or its ceramic phase) is made of a ceramic-precursor resin, which may for example be a polycarbosilane resin that is a precursor for silicon carbide (SiC), or a polysiloxane resin that is a precursor for SiCO, or a polyborocarbosilazane resin that is a precursor for SiCNB, or a polysilazane resin (SiCN). With a C—C/SiC material, the fiber preform is initially impregnated with a precursor resin for the carbon phase of the matrix, such as a phenolic type resin.

When using a gaseous technique for densifying the matrix by chemical vapor infiltration (CVI), the matrix (or its ceramic phase) is made using a gaseous precursor for SiC, which, when making a C—SiC material, may for example be methyl trichlorosilane (MTS), giving SiC by decomposition of the MTS. When making a C—C/SiC material, the carbon first phase may be made using hydrocarbon gases such as methane and/or propane that give carbon by cracking, with the SiC second phase then being deposited on the carbon first phase, e.g. by decomposing MTS.

It is naturally possible to combine densifying using a liquid technique and densifying using a gaseous technique.

In the presently described example, the annular portion 210, the frustoconical intermediate shroud 220, the end cone 230, and the primary nozzle 300 are made individually out of CMC composite material of the Cerasep® A40C type. For each of these parts, a fiber texture is made initially out of SiC fibers. Once it has been made, the fiber texture is shaped and consolidated by being impregnated with a liquid composition containing a ceramic-precursor consolidation resin.

For this purpose, the fiber texture is immersed in a bath containing the resin and usually also containing a solvent for the resin. After being drained, the fiber texture is dried in a stove. The drying may be accompanied by pre-curing or partial curing of the resin. Since such pre-curing imparts additional stiffness, it must remain limited, if it is used at all, in order to conserve sufficient deformability for the fiber texture.

It is also possible to use other known impregnation techniques, such as preparing a pre-impregnated part by passing the fiber texture through a continuous impregnator, by impregnating by infusion, or indeed by impregnating by resin transfer molding (RTM).

The consolidation resin is selected so that, after pyrolysis, it leaves a ceramic residue that is sufficient to ensure consolidation of the subsequently-made fiber preform.

A ceramic precursor resin may for example be a polycarbosilane resin that is a precursor for silicon carbide (SiC), or a polysiloxane resin that is a precursor for SiCO, or a polyborocarbosilazane resin that is a precursor for SiCNB, or a polysilazane resin (SiCN).

After being impregnated, a fiber preform that is to constitute the fiber reinforcement of the part that is to be made, and that has a shape corresponding substantially to the shape of that part, is put into its final shape by shaping the fiber texture with the help of support tooling.

The shaping of the fiber preform is preferably accompanied by compacting the fiber structure so as to increase the volume density of fibers in the composite material of the part that is to be made.

After the preform has been shaped, the resin is cured while the preform is in tooling, or its curing is completed if there has already been some pre-curing.

Thereafter, consolidation is finished off by heat treatment for pyrolyzing the resin. By way of example, pyrolysis is performed at a temperature lying in the range about 900° C. to 1000° C.

Consolidation may also be performed by chemical vapor infiltration (CVI).

After this consolidation, densification of the fiber preform with a ceramic matrix is continued.

Densification is advantageously performed by chemical vapor infiltration (CVI), the parameters of the CVI process and the nature of the reaction gas being adapted to the nature of the matrix that is to be formed. It is thus possible in the same oven for the operations of pyrolyzing the resin, of consolidation, and of densification to be run on one after the other.

The ceramic matrix made by CVI is an SiC matrix that is at least partially self-healing, such as a silicon-boron-carbon (Si-B-C) matrix, or a boron carbide ($B_4C$) matrix, or indeed a sequenced matrix having alternating matrix phases of non-healing ceramic and of healing ceramic. Reference may be made in particular to the document FR 2 401 888, U.S. Pat. Nos. 5,246,736, 5,965,266, 6,068,930, and 6,291,058.

The ceramic matrix may be deposited in a plurality of successive infiltration cycles with a machining operation between each of the cycles for opening up the pores in the surface of the material so as to facilitate depositing the matrix within the fiber reinforcement.

As shown in FIG. 1, this provides two axisymmetric parts, namely the exhaust cone 200 formed by assembling together the annular portion 210, the frustoconical intermediate shroud 220, and the end cone 230, and also the primary nozzle 300.

The invention claimed is:

1. An after-body assembly for an aeroengine comprising an exhaust casing made of metal having a plurality of arms extending radially between an inner shroud and an outer shroud, said after-body assembly further comprising an axisymmetric part made of composite material extending between an upstream end fastened to said exhaust casing and a downstream end that is free,
    wherein said axisymmetric part has an annular portion at its upstream end, which annular portion includes a plurality of first slots defining between them a plurality of resilient fastener tabs, each one of the plurality of first slots co-operating with a respective one of the plurality of arms, the exhaust casing further including fastener parts to which the plurality of resilient fastening tabs are attached,
    wherein each one of the plurality of first slots extends from the upstream end of the axisymmetric part and presents dimensions that correspond to a portion of a respective one of the plurality of arms which a respective one of the plurality of first slots co-operates,
    a plurality of second slots extending downstream from a downstream end of each of the plurality of first slots, wherein a trailing edge of a respective one of the plurality of arms abuts the downstream end of the respective one of the plurality of first slots.

2. The after-body assembly according to claim 1, including an exhaust cone made of composite material fastened on the plurality of arms of the exhaust casing at intermediate positions between the inner shroud and the outer shroud of said exhaust casing, each of said plurality of arms including one of the fastener parts at the level of said intermediate position, with a respective one of the plurality of resilient fastener tabs of the annular portion situated at the upstream end of the exhaust cone being attached to the fastener parts at the level of said intermediate position.

3. The after-body assembly according to claim 1, including an exhaust nozzle made of composite material fastened on the arms of the exhaust casing in positions close to the outer shroud of said casing, said outer shroud having the fastener parts attached to the resilient fastener tabs of the annular portion situated at the upstream end of the exhaust nozzle.

4. The after-body assembly according to claim 1, wherein the axisymmetric part is made of composite material comprising fiber reinforcement made of refractory fibers densified by a matrix that is at least partially ceramic.

5. The after-body assembly according to claim 4, wherein the matrix is a ceramic matrix selected from at least: an oxide; a nitride; a carbide; and a silicide.

6. The after-body assembly according to claim 4, wherein the axisymmetric part is made of a composite material comprising fiber reinforcement made of silicon carbide fibers densified by a silicon carbide matrix including one or more self-healing phases.

7. The aeroengine including the after-body assembly according to claim 1.

8. An aircraft fitted with at least one aeroengine according to claim 7.

* * * * *